(12) United States Patent
Benedek et al.

(10) Patent No.: US 12,325,650 B2
(45) Date of Patent: Jun. 10, 2025

(54) SYSTEM AND METHOD FOR FEEDING IMMERSED MEMBRANE UNITS

(71) Applicant: FIBRACAST LTD., Hannon (CA)

(72) Inventors: Diana Benedek, Rancho Santa Fe, CA (US); Charles Bennett, Burlington (CA); Babak Lakghomi, Hamilton (CA)

(73) Assignee: FIBRACAST LTD., Hannon (CA)

( * ) Notice: Subject to any disclaimer, the term of this patent is extended or adjusted under 35 U.S.C. 154(b) by 461 days.

(21) Appl. No.: 17/624,915

(22) PCT Filed: Jul. 16, 2019

(86) PCT No.: PCT/CA2019/050980
§ 371 (c)(1),
(2) Date: Jan. 5, 2022

(87) PCT Pub. No.: WO2021/007646
PCT Pub. Date: Jan. 21, 2021

(65) Prior Publication Data
US 2022/0274855 A1    Sep. 1, 2022

(51) Int. Cl.
*C02F 3/12* (2023.01)
*B01D 63/08* (2006.01)
(Continued)

(52) U.S. Cl.
CPC ........ *C02F 3/1273* (2013.01); *B01D 63/0821* (2022.08); *B01D 63/0822* (2022.08);
(Continued)

(58) Field of Classification Search
CPC .... C02F 3/1273; C02F 2303/20; C02F 1/444; C02F 3/1268; B01D 63/0821;
(Continued)

(56) References Cited

U.S. PATENT DOCUMENTS

| 5,639,373 A | 6/1997 | Mahendran et al. |
| 6,245,239 B1 * | 6/2001 | Cote ................... B01D 63/026 |
| | | 210/636 |

(Continued)

FOREIGN PATENT DOCUMENTS

| CA | 2564007 C | 5/2011 |
| CN | 101426565 A | 5/2009 |

(Continued)

OTHER PUBLICATIONS

Translation of Lihua (CN101314511B) (Year: 2011).*

(Continued)

*Primary Examiner* — Ekandra S. Miller-Cruz
(74) *Attorney, Agent, or Firm* — Borden Ladner Gervais LLP; Michael Damiani (57) ABSTRACT

In an immersed membrane system, the influent flows into an open membrane tank. The membrane tank can have multiple horizontally spaced immersed membrane units. The immersed membrane units may have flat sheet membrane elements within a membrane case. One or more ducts are provided in the tank for directing the flow of influent to the immersed membrane units. In some examples, the influent is divided into sub-streams that are fed through baffles to a corresponding immersed membrane unit, optionally in generally equal amounts, optionally in a single pass flow pattern. In a process of operating a membrane tank, the influent flow is directed across the bottom of the membrane tank and divided into multiple portions. Each of the multiple portions is fed directly to the bottom of a corresponding immersed membrane unit located in the tank. The influent may be mixed liquor in a membrane bioreactor (MBR).

25 Claims, 9 Drawing Sheets

(51) Int. Cl.
  *B01D 65/08* (2006.01)
  *B01D 69/06* (2006.01)
  *B01D 71/02* (2006.01)

(52) U.S. Cl.
  CPC ............ *B01D 65/08* (2013.01); *B01D 69/06* (2013.01); *B01D 71/02* (2013.01); *C02F 2303/20* (2013.01)

(58) Field of Classification Search
  CPC .... B01D 63/0822; B01D 65/08; B01D 69/06; B01D 71/02; B01D 2313/08; B01D 2313/12; B01D 2313/26; B01D 2317/04; B01D 61/18; B01D 2315/06; B01D 2321/185; Y02W 10/10
  USPC ........................................................ 210/620
  See application file for complete search history.

(56) References Cited

U.S. PATENT DOCUMENTS

| | | | |
|---|---|---|---|
| 11,045,768 B2 | 6/2021 | Tomescu | |
| 2005/0123727 A1 | 6/2005 | Hester et al. | |
| 2006/0201876 A1 | 9/2006 | Jordan | |
| 2007/0007214 A1 | 1/2007 | Zha et al. | |
| 2009/0020475 A1 | 1/2009 | Jordan | |
| 2011/0005987 A1* | 1/2011 | Matsuzaki | B01D 63/0821 210/232 |
| 2020/0238218 A1* | 7/2020 | Rich | B01D 69/06 |

FOREIGN PATENT DOCUMENTS

| | | | | |
|---|---|---|---|---|
| CN | 101314511 B | * | 9/2011 | ............ Y02W 10/10 |
| CN | 205294911 U | | 6/2016 | |
| CN | 107061772 A | | 8/2017 | |
| JP | 2001062480 A | | 3/2001 | |
| JP | 2006508786 A | | 3/2006 | |
| JP | 2018192419 A | * | 12/2018 | ............ B01D 65/08 |
| KR | 100814323 B1 | | 3/2008 | |
| KR | 100984628 B1 | | 9/2010 | |
| WO | 2009004725 A1 | | 1/2009 | |

OTHER PUBLICATIONS

Translation of Yatsugi (JP2018192419A) (Year: 2018).*
Brazilian Patent Application No. BR1120220007752, Office Action dated Feb. 24, 2023—English Translation Not Available.
European Patent Application No. 19937934.8, Extended European Search Report dated Feb. 20, 2023.
Singapore Patent Application No. 11202200314R, Search Report and Written Opinion dated Mar. 7, 2023.
Indian Patent Application No. 202217002912, Office Action dated Mar. 1, 2024.
Japanese Patent Application No. 2022-502234, Office action dated Feb. 6, 2024—English Translation available.
Taiwanese Patent Application No. 109123864, Office Action dated May 3, 2024.
Chinese Patent AppIn No. 201980098483.4, Office Action dated May 1, 2024.
International Patent Application No. PCT/CA2019/050980, International Preliminary Report on Patentability dated Jan. 27, 2022.
International Patent Application No. PCT/CA2019/050980, International Search Report and Written Opinion dated Apr. 8, 2020.
Canadian Patent Application No. 3146008 Office Action dated Jul. 24, 2023.
Chinese Patent Application No. 201980098483.4, Office Action dated Aug. 9, 2023—English Translation Not Available.
Japanese Patent Application No. 2022-502234, Office Action dated Aug. 29, 2023 (English Translation Available).
Taiwanese Patent Application No. 109123864, Office Action dated Jul. 11, 2024, English Translation Available.
Chinese Patent Application No. 201980098483.4, Office Action dated Oct. 26, 2024—English Translation Available.
Israeli Patent Application No. 289660, Office Action dated Oct. 1, 2024 English translation available.
Korean Patent Application No. 10-2022-7004932, Office Action dated Nov. 21, 2024—English Translation Available.
Singapore Patent Application No. 11202200314R, Office Action dated Nov. 25, 2024.
Saudi Arabian Patent Application No. 522431377, Office Action dated Dec. 5, 2024—English Translation Available.
United Arab Emirates Patent Application No. P6000066/2022, Office Action dated Nov. 18, 2024—English Translation Available.
Chinese Patent Application No. 201980098483.4, Office Action dated Aug. 9, 2023—English Translation Available.
Chinese Patent AppIn No. 201980098483.4, Office Action dated May 1, 2024—English Translation Available.
Chinese Patent Application No. 201980098483.4, Office Action dated Jul. 31, 2024—English Translation Available.
Australian Patent Application No. 2019456757, Office Action dated Apr. 14, 2025.

* cited by examiner

SYSTEM AND METHOD FOR FEEDING IMMERSED MEMBRANE UNITS

FIELD

This invention relates to immersed membrane filters and methods of operating them.

BACKGROUND

Membranes are typically in the form of flat sheets, tubes or hollow fibers. In an immersed membrane unit, multiple membrane elements are assembled together into modules or cassettes and immersed in an open tank. Permeate is withdrawn from the modules by suction created by gravity or a permeate pump connected to an inner surface of the membranes. Typical applications include filtering surface water to produce drinking water, treating wastewater in a membrane bioreactor (MBR) or treating secondary effluent in a tertiary filtration application. In these applications, the membranes usually have pores in the microfiltration or ultrafiltration range.

Some examples of immersed hollow fiber membrane units are described in U.S. Pat. No. 5,639,373. In these hollow fiber membrane units, hollow fiber membranes extend between upper and lower potting heads. In other examples there is only one potting head and/or the membranes extend horizontally. Some examples of immersed flat sheet membrane units are described in U.S. Pat. No. 6,287,467. In flat sheet membrane units, pairs of flat sheet membrane are assembled together over frames or spacers to form elements. Many of these elements are placed in parallel in a cassette. The cassette may have a membrane case, alternatively called a shroud, which forms a vertically oriented tube around the elements. A set of aerators may be attached to the cassette. In some cases, a diffuser case below the cassette contains a set of aerators in a vertically oriented tube. The aerators create bubbles that scour the surface of the membranes and also create an air lift that circulates water upwards past the membranes. Similar structures are provided with flat plate ceramic membranes. An alternative flat sheet immersed membrane unit with corrugated membrane sheets assembled without interior frames or spacers is described in US Publication Number US 2017/0095773, which is incorporated herein by reference.

In membrane filtration system, one or more immersed membrane units are typically placed in an open (i.e. having a free water surface) membrane tank. In a membrane bioreactor (MBR), the membrane filtration system can function like the secondary clarifier in an activated sludge process. In this case, water is treated in process tanks upstream of the membrane tank to produce mixed liquor, which flows to the membrane tank. Permeate is withdrawn through the membrane units leaving activated sludge in the membrane tank. The activated sludge is withdrawn from the membrane tank and divided into waste activated sludge (WAS) and return activated sludge (RAS). The RAS is returned to the process tanks and becomes part of the activated sludge. The influent (raw wastewater) flow rate (Q) is roughly balanced by the total of the permeate flow rate and the WAS flow rate. The RAS flow rate is typically in the range of 2 Q to 5 Q.

SUMMARY

This summary is intended to introduce the reader to the invention and the detailed description to follow but not to limit or define the claimed invention.

In an immersed membrane system, an influent flows into an open membrane tank, permeate is removed through the membranes, and a concentrate flows out of the membrane tank. The inventors have observed that, despite scouring each membrane unit equally with bubbles, fouling rates can differ between membrane units in different parts of a tank. For example, in a system where membrane units are distributed in a line along a narrow tank, and the tank is fed with influent from one end, the most downstream membrane unit fouls the most. This may be caused, at least in part, by a solids (or other foulant) concentration gradient that develops along the length of the tank. However, the membrane units are typically all connected to common permeate and backwash pipes and operated with the same permeation and cleaning protocols. As a result, either the upstream membrane units are not operated efficiently or the downstream membrane units foul excessively. However, this configuration is used in many immersed membrane plants, including membrane bioreactors (MBRs), among other reasons because it facilitates creating large systems with having multiple parallel membrane tanks. Accordingly, there is already a large installed base of immersed membrane systems with narrow tanks.

This specification describes an open membrane tank having one or more immersed membrane units. Each membrane unit may have one or more cassettes or other structures containing filtering membranes. Optionally, the membrane units are spaced along the length of the tank. Optionally, the immersed membrane units may have flat sheet membrane elements, which may be located within a membrane case. An inlet is provided on one end of the tank, optionally near the bottom of the tank. One or more ducts are provided for connecting the inlet to the one or more immersed membrane units. In some examples, a duct has multiple openings each connected to a different membrane unit. Optionally, the openings have varying sizes, which may be selected to help equalize the flow of mixed liquor to the different membrane units. Optionally, the duct may have a horizontally extending baffle below a membrane unit. In some cases, the membrane tank is part of a membrane bioreactor.

This specification also describes a process of operating an immersed membrane filtration system, for example the open membrane tank of an MBR. In the process, a flow of influent into a membrane tank is directed to the bottom of one or more immersed membrane units. Optionally, the flow of mixed liquor may be divided into multiple portions. In some cases, the flow rate of each of the multiple portions is within 10% of an average flow rate of the multiple portions. Optionally, the influent is further directed upwards through an immersed membrane unit. In some cases, a once-through or vertical plug flow regime may be provided through the membrane units. The influent may be, for example, mixed liquor as in an MBR or secondary effluent as in tertiary filtration.

The membrane tank and process described herein results in influent being fed generally directly one or more immersed membrane units. This helps to prevent influent, for example influent being fed to a downstream membrane unit, from being pre-concentrated by other membrane units. Optionally, the system can also be configured such that the flow rate of influent through various immersed membrane units is generally equal. Providing influent at its original concentration to the different immersed membrane units, optionally with generally equal flow rates, can result in the system as a whole being more productive and/or easier to operate. Further, the influent is forced upwards through the membrane units. The flow of influent water upwards through a membrane unit can help to force adjacent membranes apart from each other, inhibit the dewatering or retention of sludge in the membrane unit, and/or disperse fresh influent throughout the membrane unit. In this way, the flow of influent into an immersed membrane tank can be used to help prevent fouling or sludging in the membrane units and/or reduce membrane cleaning frequency. In the case of an MBR, some of the energy involved in recirculating RAS can be recovered in the form of liquid velocity or impulse.

DETAILED DESCRIPTION

Figure 1:
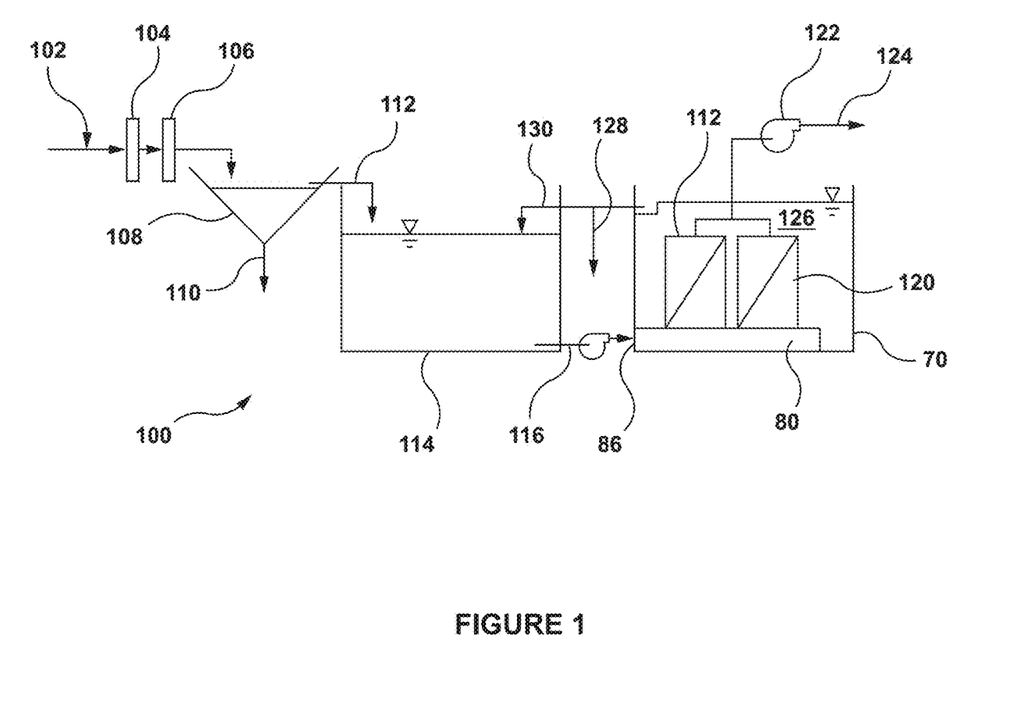
FIG. 1 is a schematic drawing of a membrane bioreactor.

FIG. 1 shows a membrane bioreactor (MBR) 100 using an activated sludge process. Wastewater 102, for example industrial wastewater or municipal sewage, is collected and passes through a coarse screen 104 and, optionally, a fine screen 106. The fine screen 106 may have openings of, for example, 2-5 mm and may be located further downstream in the MBR 100 than in the position shown in FIG. 1. Screened wastewater 102 flows through a primary treatment unit 108, such as a clarifier or rotating belt filter. Primary treatment unit 108 produces primary sludge 110 and primary effluent 112.

Primary effluent 112 flows to one or more process tanks 114. In some examples, there is one aerobic process tank 114. In other examples, there can be a series of two or more process tanks 114 containing aerobic, anoxic and/or anaerobic treatment zones. Microorganisms in the process tanks 114 digest the primary effluent 112 and produce mixed liquor 116. Mixed liquor 116 is transferred to a membrane tank 70. In the example shown, the mixed liquor 116 is pumped to the membrane tank 70. In other examples, mixed liquid flows by gravity to the membrane tank 70.

The membrane tank 70 contains one or more ducts 80 and one or more membrane units 120. The one or more ducts 80 extend from an inlet 86 of the membrane tank 70 to the bottom of the membrane units 120. A duct 80 provides a plenum that mixed liquor 116 flows through in the membrane tank 70 to reach one or more membrane units 120. The mixed liquor 116 then flows upwards through the membrane units 120 and into the membrane tank 70 outside of the membrane units 120. A permeate pump 122 withdraws permeate from the mixed liquor 116 as it passes through the membrane units 120. Accordingly, the mixed liquor 116 is concentrated in the membrane units and leaves the membrane units as activated sludge 126. Activated sludge 126 is withdrawn from the membrane tank 70, for example by pump or gravity, and divided into waste activated sludge (WAS) 128 and return (or recycled) activated sludge (RAS) 130.

In FIG. 1, the membrane tank 70 is part of an MBR 100. The flow rate of wastewater 102 into an MBR 100 is conventionally called Q. The flow rate of RAS 130 may be, for example, in the range of 1 Q to 5 Q. The flow rate of mixed liquor 116 may be, for example, 2 Q to 6 Q. Accordingly, a significant amount of energy is applied to recirculating RAS in an MBR 100. This can result in the mixed liquor 116 flowing into membrane tank 70 having a significant flow rate and/or energy content. However, in some cases, the membrane tank 70 could be part of another filtration system such as a surface or underground water filtration system, intended to produce potable water or industrial process water, or a tertiary filtration system, intended to polish wastewater that has already been treated by another process.

Figure 2:
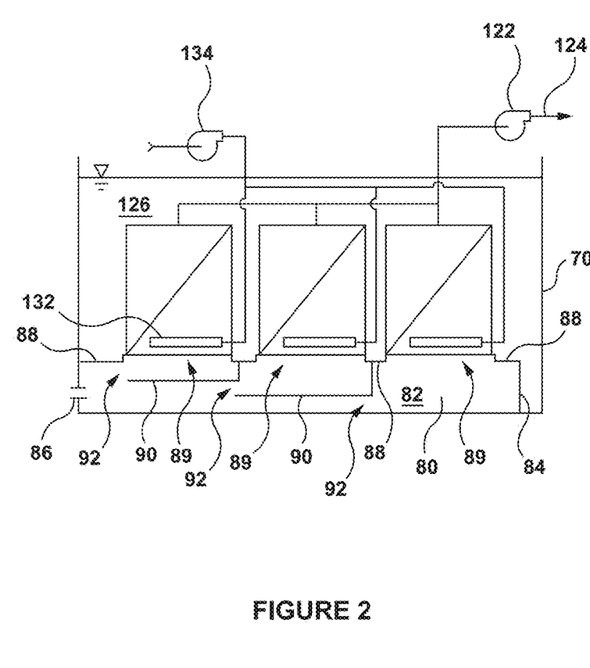
FIG. 2 is a schematic side view of a membrane tank of the membrane bioreactor of FIG. 1 with ones side removed showing a duct.
Figure 3:
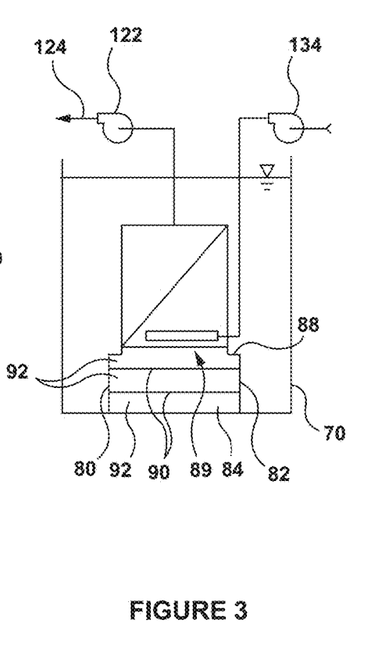
FIG. 3 is a schematic end view of the membrane tank of FIG. 2 with the front of the tank removed.

The membrane tank 70 is shown in side view in FIG. 2 and end view in FIG. 3. The membrane tank 70 may have a length that is 2 times or more, or 4 times or more, than the width of the membrane tank 70. The spacing between the walls of the membrane tank 70 and the front, sides and back of the membrane units 120 could be closer than in the examples shown.

In the example shown, a duct 80 is formed in part by the bottom of the membrane tank 70. Sidewalls 82 extend upwards from the bottom of the membrane tank 70 to the bottom of the membrane units 120. The duct 80 extends along the length of the tank 70 below the membrane units 120. The downstream end of the duct 80 is closed by an end wall 84. The top of the duct 80 is formed of plates 88. The plates 88 are discontinuous, providing gaps 89 generally equal in length and width to horizontal dimensions of the membrane units 120.

The duct 80 optionally has baffles 90. In the example shown, the baffles 90 extend downwards from the plates 88 so that water flowing through the baffles 90 can disperse over the entire area of the gaps 89 before entering the membrane units 120. A gap 89 may have an area that is at least 80% of the horizontal cross sectional area of a membrane unit 120 over it. The baffles 90 also extend horizontally at least part way, optionally all of the way, below the bottom of a cassette 90. The horizontal extension of the baffles 90 defines an opening 92. Optionally, the openings 92 have different sizes relative to each other to help provide a selected division of the total influent mixed liquor flow to the membrane units 120. The horizontal extension of a baffle 90 over substantially all (i.e. 80% or more or 90% or more) or all of the bottom of a membrane unit 120, but displaced below to the top of the duct 80, tends to produce a selected distribution of the influent flow among the membrane units 120 over a broader range of influent flow rates. Without intending to be limited by theory, this may be in part because the openings 92 are small (i.e. 50% or less) in area relative to gaps 89 or because the openings 92 face into the influent flow upstream of the gaps 89.

In the example shown, the height of an opening 92 associated with a first (upstream) baffle 90 is defined by the vertical distance between the first baffle 90 and the plates 88. The height of an opening 92 associated with an intermediate baffle 90 is defined by the vertical distance between the intermediate baffle 90 and first baffle 90. A baffle 90 for the most downstream membrane unit 120 is provided by part of the floor of the tank 70 and the end 84 of the duct 80. An opening 92 for the most downstream membrane unit 120 is defined between the intermediate baffle 90 and the bottom of the tank 70. Alternatively, a separate duct 80 could be provided for each membrane unit 120, but it is expected that this would require additional material and fabrication and possibly increase the overall head loss of the duct or ducts 80. In the example shown, the parts of the duct 80 between the openings 92 and the gaps 89 provide paths for mixed liquor to flow from the duct 80 into the bottom of the membrane units 120.

The membrane units 120 optionally include a membrane case, alternatively called a shroud, which is a structure that provides a vertically extending conduit containing the membranes themselves. The membrane case can be a separate structure or may be formed integrally with other parts of the membrane unit 120. The membrane units 120 optionally include aerators 132 that produce bubbles when provided with air from a blower 134. In some cases, the aerators 132 are integrated with the membrane units 120, for example being locate within the membrane case. In other cases, aerators can be placed below the membrane units 120, optionally in a shroud or aerator case that provides a vertically extending conduit connecting the duct 80 with a membrane unit 120. If the membranes are within a membrane case, the membranes are preferably arranged to provide vertical passages for liquid to flow upwards past the membranes, through the membrane units. For example, the membranes may be flat sheet membranes or flat ceramic membranes.

In some examples, connections between the duct 80 and the mixed liquor inlet 86, and connections between the duct 80 and the bottom of the membrane units 120, are generally fluid tight. Other than connections to the inlet 86 and the membrane units 120, the duct 80 is generally a closed plenum. Membrane and aerator cases, if used, are generally closed tubes. In this way, the influent to the membrane tank 70 is provided generally directly to the membrane units 120. There is substantially no mixing of previously concentrated influent in the membrane tank 70 with influent being fed to the membrane units through the duct 80. However, as these are large civil works, perfectly fluid tight connections or perfectly closed ducts or membrane cases are not expected. Connections between, for example, a bent sheet metal flange of a duct 80 and the concrete wall or floor of a membrane tank 70, or the frame of a cassette 50, may leak to some extent, and the duct 80 itself might be made of multiple pieces that are not connected together with perfectly fluid tight connections. However, the use of an open membrane tank 70 and immersed membrane units 120 allows for more economical construction of large systems relative to a completely enclosed system.

Despite being in an open membrane tank 70, which is conventionally operated as a stirred tank reactor, the membranes units 120 in the example of FIGS. 2 and 3 can operate under a flow regime that is more like a once-through crossflow. Preferably, at least 90%, or at least 95%, of the influent entering the membrane tank 70 is directed through the duct 80 to the membrane units 120, and no more than 10%, or no more than 5%, of influent flowing upwards through the membrane units 120 is influent from the membrane tank 70 outside of the duct 80 as opposed to influent from the inlet 86 to the membrane tank 70. Optionally, the duct 80 and connections to and from it are sufficiently closed and tight such that the total suspended solids (TSS) concentration of influent at the bottom of the membrane units 120 is not more than 5%, or not more than 3%, higher than the TSS concentration of the influent. The concentration of influent reaching membrane units 120 in different parts of the membrane tank 70 is thereby also generally equalized. The duct 80 can also help to provide a generally even distribution of flow to membrane units 120 in different parts of the membrane tank 70. In examples where the membrane units 120 include membrane cases (and aerator cases if the aerators 132 are below the membrane units), the concentration of the water leaving the membrane units 120 is also generally equalized. For example, in an MBR 100 as in FIG. 1 the total suspended solids (TSS) concentration of water (concentrate) at the top of the membrane units 120 is not more than 5% less than the TSS concentration of the activated sludge 126 in the membrane tank 120 as a whole. In the case of an MBR 100, where the mixed liquor 116 and activated sludge 126 are high in solids, reducing a difference in solids concentration between membrane units 120 can reduce the membrane cleaning frequency and may increase average flux of the membrane units 120.

Influent (i.e. mixed liquor 116) flows from the duct 80 upwards through the membrane cases of the membrane units 120 at an average velocity that is largely determined by the influent flow rate and the open horizontal cross sectional area of the membrane cases of the membrane units. The ability to achieve significant concentration of the influent in one pass through a membrane unit 120 (which helps to avoid excessive RAS recirculation rates or 6 Q or more) is determined largely by the packing density of the membrane units 120 relative to their horizontal cross sectional area (footprint). High footprint in flat form (i.e. flat sheet or flat ceramic) membranes can by close spacing and/or multiple sheet stacks. For example, the clear vertical space (i.e. face-to-face separation) between membranes may be 5 mm or less, 3 mm or less or 2 mm or less. Membrane units 120 may be made with 2 or 3 or more modules stacked vertically.

Figure 11:
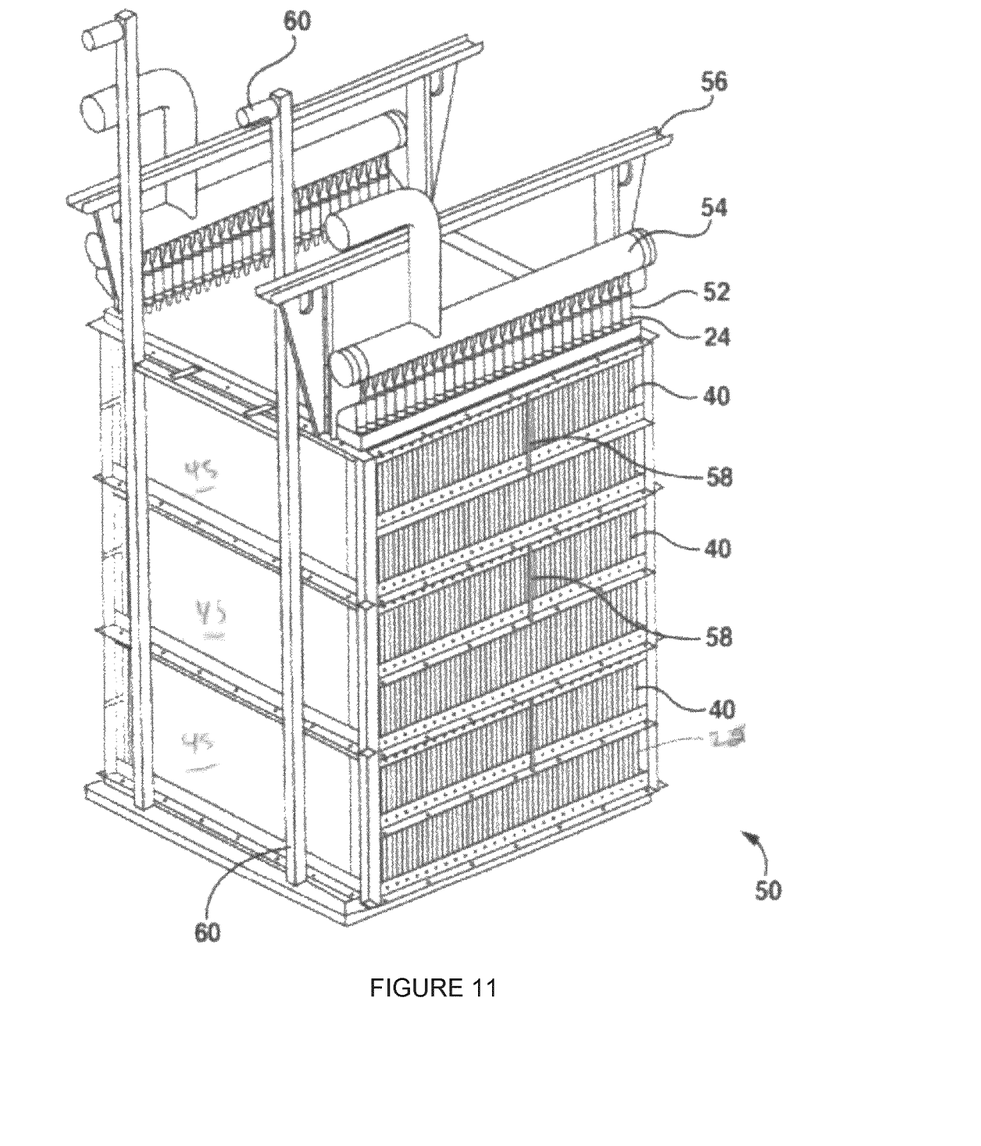
FIG. 11 is an isometric view of a cassette having three of the blocks of FIG. 8 stacked together.

In one trial with four membrane units 120 in an MBR, each in the form of a cassette 50 as shown in FIG. 11 with 1.5 mm face-to-face spacing between membrane sheets, a RAS recirculation rate of 2.78 Q produced an average (upwards) liquid velocity in the cassettes 50 of 0.023 m/s. Increasing the RAS recirculation rate to 5 Q and 5.6 Q produced average (upwards) liquid velocities of 0.035 and 0.046 m/s respectively. Average liquid velocity was calculated considering the horizontal area of the clear spaces in the cassette (i.e. the cumulative area of the multiple 1.5 mm wide vertically extending gaps between individual membranes) and the influent flow rate into the bottom of each cassette but without adjusting for bubbles provided into the cassette. While operating at a velocity of 0.023 m/s, there was a 20% difference between the maximum and minimum mixed liquor suspended solids (MLSS) concentration in water collected at the top of the four cassettes (i.e. about a 10% variation from the average), and two of the four cassettes had a higher fouling rate than the other two cassettes. When operating at 0.046 m/s, there was only a 10% difference between the maximum and minimum mixed liquor suspended solids (MLSS) concentration in water collected at the top of the four cassettes (i.e. about a 5% variation from the average), and all four cassettes had similar low fouling rates. Operation at a velocity of 0.035 m/s also produced sustainable operation with similar low fouling rates in all four cassettes. Without intending to be limited by theory, the relatively poor results at the lowest velocity might have been due to the low velocity itself, to the unequal distribution of total influent flow between the four cassettes that occurred in this particular duct (which had varying opening sizes but using a baffle design not as shown in FIGS. 2 and 3) at the low RAS recycle rate, or a combination of both.

Optionally, average liquid velocity in a membrane unit is 0.025 m/s or more or 0.03 m/s or more. With modification of one or more parameters (for example RAS recirculation rate), higher average liquid velocities of up to 0.05 m/s, up to 0.7 m/s or up to 0.1 m/s can be achieved. These velocities are well below velocities typically used in cross flow filtration in conventional sealed systems (i.e. plate and frame systems, inside/out hollow fiber systems or tubular membrane systems), which are generally about 0.2 m/s or more when filtering generally clean influent and 1.0 m/s or more when filtering mixed liquor. Without intending to be limited by theory, because of the much lower velocities involved, the shear force of liquid flowing over the membrane surface in the system and process described herein might not be effective in the same sense that fluid shear is material in typical cross flow filtration systems. However, providing fresh mixed liquor at a generally consistent fluid velocity through multiple cassettes appears to advantageously provide consistent conditions among the cassettes, which thereby avoids having cleaning and operational protocols for the system determined by one or more cassettes that foul more rapidly than the others. Further, the forced flow of liquid may provide one or more effects, for example forcing membranes apart or forcing incipient accumulations of solids out from between membranes, that are not shear force related but nevertheless use the energy of flowing influent to help avoid fouling or sludging in a way that is not provided by a bubble induced (i.e. airlift) flow of liquid through the cassette.

FIGS. 4 to 11 describe an example of a cassette 50, or various parts of it. The cassette 50 may be used, alone or in a set of multiple cassettes 50, to provide a membrane unit 120.

Figure 4:
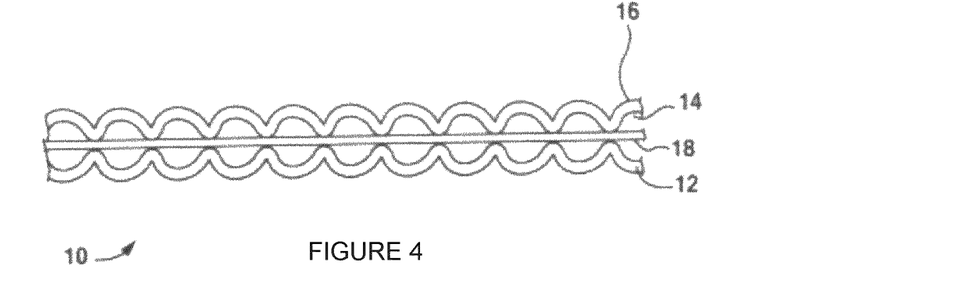
FIG. 4 shows an edge view of a membrane sheet.

FIG. 4 shows an example of a membrane sheet 10, alternatively called an element. The membrane sheet 10 is made up of two substrate sheets 12 formed and bonded together to provide internal channels 14. The outsides of the substrate sheets 12 are coated with a porous separation layer 16. The separation layer 16 may be made by casting a membrane forming dope over the substrate sheets 12 and then curing the dope in a quench bath. This produces pores according to the non-solvent induced phase separation (NIPS) method, typically in the ultrafiltration or microfiltration range. A central sheet 18 between the two substrate sheets 12 is optional but may be added to provide a more rigid membrane sheet 10 if desired. In other examples, elements can be made of two flat sheet membranes attached together over a frame or spacer, for example in the manner of Kubota or Microdyn Nadir elements. In other examples, elements can be made of plate form ceramics.

Figure 5:
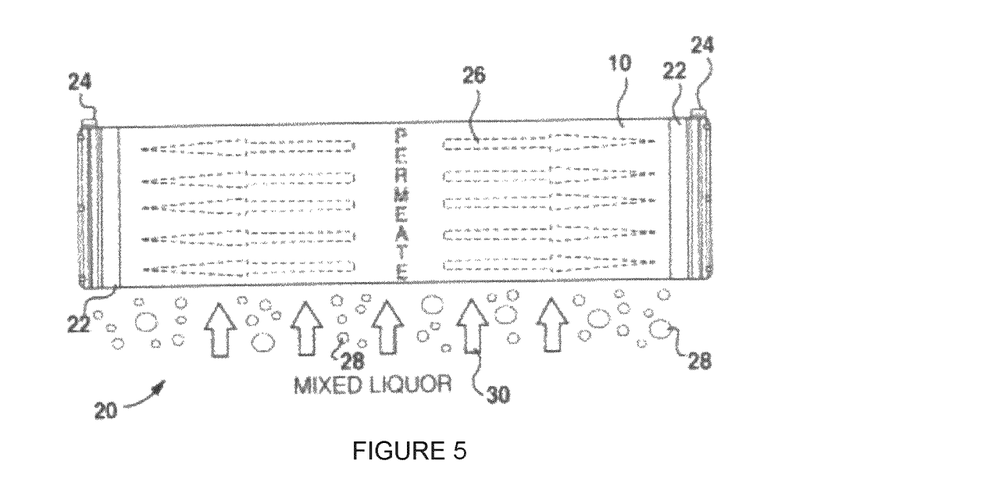
FIG. 5 shows an elevation view of a membrane module including a membrane sheet as in FIG. 4.

FIG. 5 shows a membrane module 20. The module 20 has one or more membrane sheets 10. The edges of the membrane sheets 10 that are open to the internal channels 14 (i.e. the edge shown in FIG. 1) are potted in headers 22, alternatively called potting heads or permeate collectors. When in use, the headers 22 are oriented generally vertically and the internal channels 14 are generally horizontal. Suction applied to permeate ports 24 of the headers 22 for example by pump or siphon causes permeate 26 to be produced in the internal channels 14 and flow through the headers 22. Optionally, permeate can be withdrawn from one or both ends of the membrane sheet 10. A module 20 typically has multiple parallel membrane sheets 10. Adjacent membrane sheets 10 are separated by vertical gaps of generally equal width, for example between 1.5 mm and 4 mm wide. In one example, a module 20 is about 1900 mm wide, about 800 mm high and about 60 mm thick and contains 16 membrane sheets 10 spaced generally equally across its thickness. In this example, the headers 22 and the outer membrane sheets 10 form a membrane case. In other examples, a module may be surrounded by a separate membrane case.

When used in a membrane bioreactor (MBR) or a filtration plant, bubbles 28 provided from below the module 20 help the liquid 30 being filtered flow upwards through the module 20, including through the gaps between adjacent membrane sheets 10.

Figure 6:
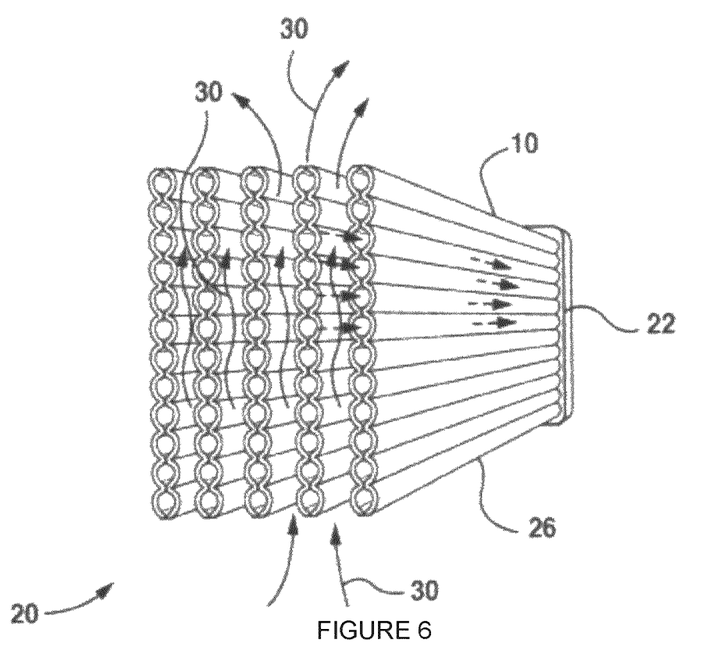
FIG. 6 is a schematic perspective view of a cut open module showing feed liquid and permeate flow directions.

FIG. 6 shows a schematic view of a module 20 cut open to further illustrate the flow of liquid 30 through the module 20. The undulating shape of the membrane sheets 10 creates turbulence in the liquid 30 as it rises. The membrane sheets 10 may vibrate as the liquid 30 and bubbles 28 move between them. The bubbles 28 may provide some direct scouring of the membrane sheets 10 in addition to assisting the liquid flow.

Figure 7:
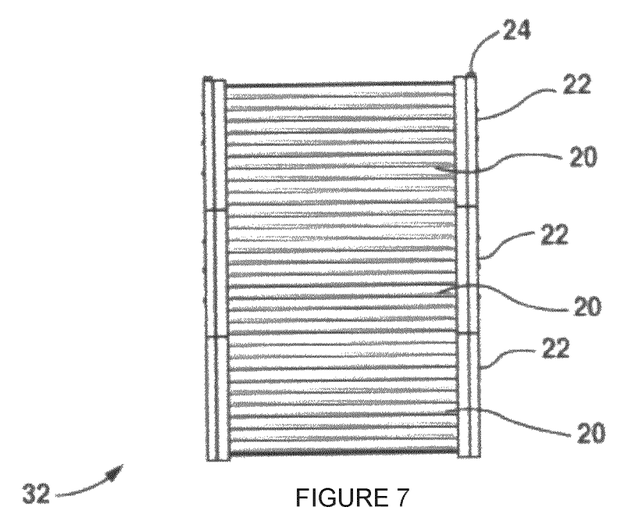
FIG. 7 shows an elevation view of three of the modules of FIG. 5 stacked together.

FIG. 7 shows a stack 32 of three modules 20. The modules 20 are stacked vertically on top of each other. The permeate ports 24 of a lower module fit into sockets (not visible) in the headers 22 of an upper module. The sockets in the lowest module 20 are plugged. The permeate ports 24 of the highest module can be connected to a permeate withdrawal pipe and used to withdraw permeate from all three modules 20. Stacks 32 may also be made with two, four or other numbers of modules 20. Since the headers 22 of adjacent modules are vertically aligned and continuous, feed liquid can flow vertically through the entire stack 32 without being impeded by the headers 22.

Figure 8:
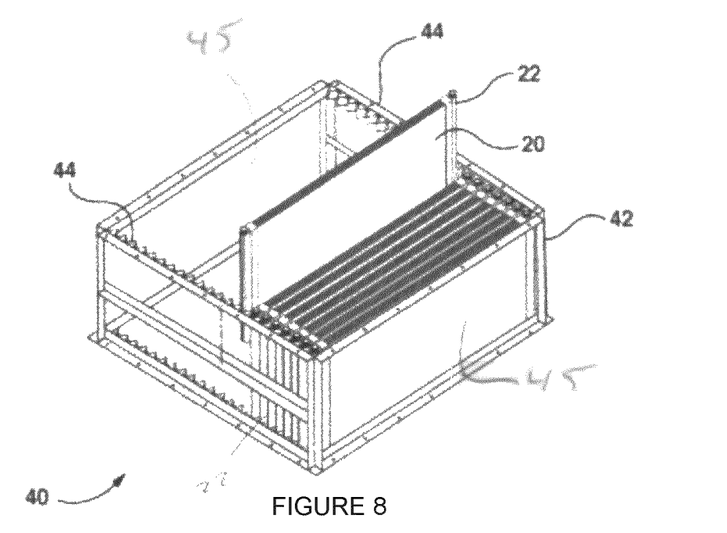
FIG. 8 is an isometric view of a block containing several of the modules of FIG. 5.

FIG. 8 shows a block 40 containing a plurality of modules 20 in a frame 42. The modules 20 are placed side by side in the frame 42. A module 20 may slide vertically into or out of the frame 42. When in the frame 42, the headers 22 of the module 20 fit into corresponding slots provided, in the example shown, by plastic moldings 44 attached to the frame 42. The frame 42 is preferably made of stainless steel, although other materials may also be used. Side plates 45 cover the sides of the frame parallel to the modules 20. The headers 22 each include multiple modules 20 and adjacent headers 22 touch each other, or are close to touching, for example less than 10 mm apart from each other or less than 5 mm apart from each other. The side plates 45 and headers 22 thereby form an integral membrane case that defines a vertically extending fluid passageway through the block 40.

Figure 9:
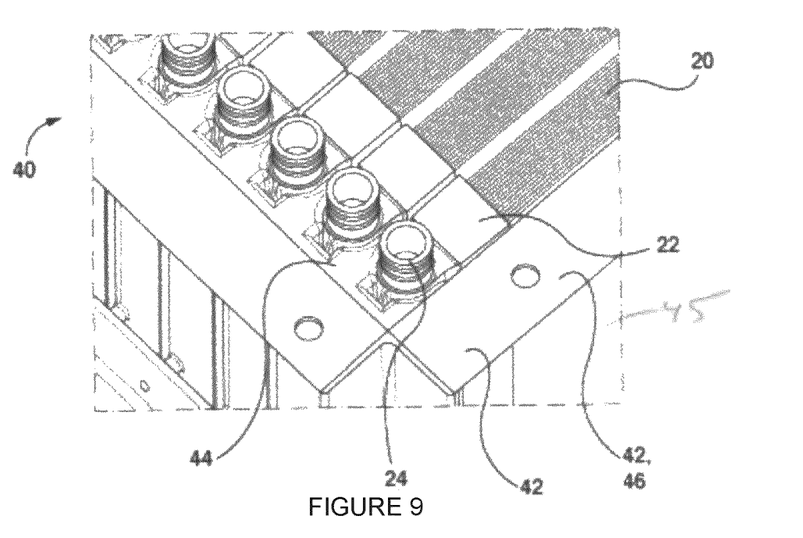
FIG. 9 is an enlarged view of part of the block of FIG. 8.

FIG. 9 shows an enlarged view of the top of a block 40. A flange 46 at the top of the block 40 and a similar flange (not shown in FIG. 9) on the bottom of the block 40 can be used to support an upper or lower block 40 and to allow blocks 40 in a stack to be fastened together. The permeate ports 24 of the modules 20 protrude above the flange 46 to allow for permeate connection between modules 20 in a stack as described in FIG. 4.

Figure 10:
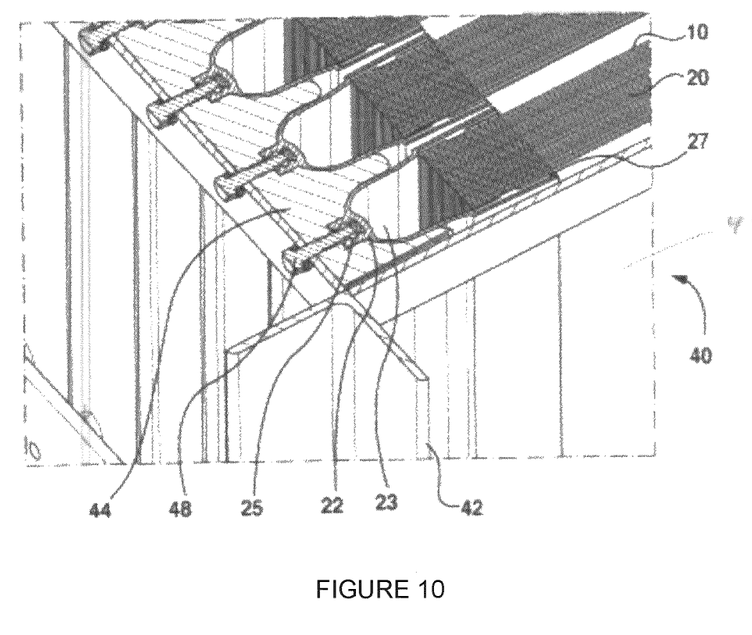
FIG. 10 is an enlarged view of a section of the block of FIG. 8.

FIG. 10 shows an enlarged view of a horizontal section of part of the block 40. The header 22 contains a permeate chamber 23 defined by the header 22, the edges of the membrane sheets 10 and the potting resin 27 between the membrane sheets 10. The permeate chamber 23 is in fluid communication with the permeate ports 24 and sockets. To hold a module 20 in the frame 42, a bolt 48 passes through the frame 42 and is threaded into a nut 25 adhered to the header 22, or molded integrally with the plastic molded header 22 as shown.

FIG. 11 shows a cassette 50 made up of three blocks 40 stacked vertically together, one on top of the other. Optionally, a cassette 50 made have one, two, four or another number of bocks 40. The permeate ports 24 of the upper block 40 are connected to a permeate header pipe 54, optionally through connector pipes 52 as shown. The frames 42 of the blocks 40 are connected to each other by struts 58 that, in the example shown, are threaded rods with nuts on their ends. Struts 58 also attach the upper block 40 to a cassette frame 56, which may be used to hang the cassette 50 in a tank. Air supply pipes 60 bring air to the bottom of the cassette to be fed to a set of aerators (not visible) under the lowest block 40. The moldings 44 and side plates 45 of vertically adjacent block 40 form a continuous vertically extending passageway for fluids to flow through the cassette 50. The cassette 50 as a whole thereby has an integral membrane case. Alternatively, a separate membrane case can be provided.

The cassette 50 can be lowered into a membrane tank 70, or lifted out of the membrane tank 70, by a crane or hoist attached to the cassette frame 56. The cassette frame 56 may rest on ledges of the membrane tank 70. In the example shown, the cassette 50 has 84 modules 20. The packing density by volume is 450-500 $m^2/m^3$. Packing density by footprint is about 850 $m^2/m^3$. In one example, each module 20 is about 7-10 cm wide. The modules 20 may be arranged in a vertical stack from 1 to 5 modules 20 high in a cassette 50. Each stack of modules 20 in the cassette 50 has one aerator about 3-6 cm wide below the lowest module 20 in the stack.

Additional information describing suitable membrane sheets, modules, blocks and cassettes can be found in US Publication Number US 2017/0095773, Method of Operating Membrane Filter by Fibracast Ltd published on Apr. 6, 2017, International Publication Number WO 2013/056373, Coating Device and Process for Coating Formed Sheet Membrane Element by Fibracast Ltd. published on Apr. 25, 2013 and International Publication Number WO 2011/130853, Formed Sheet Membrane Element and Filtration System by Fibracast Ltd. published on Oct. 27, 2011, which are incorporated herein by reference.

Figure 12:
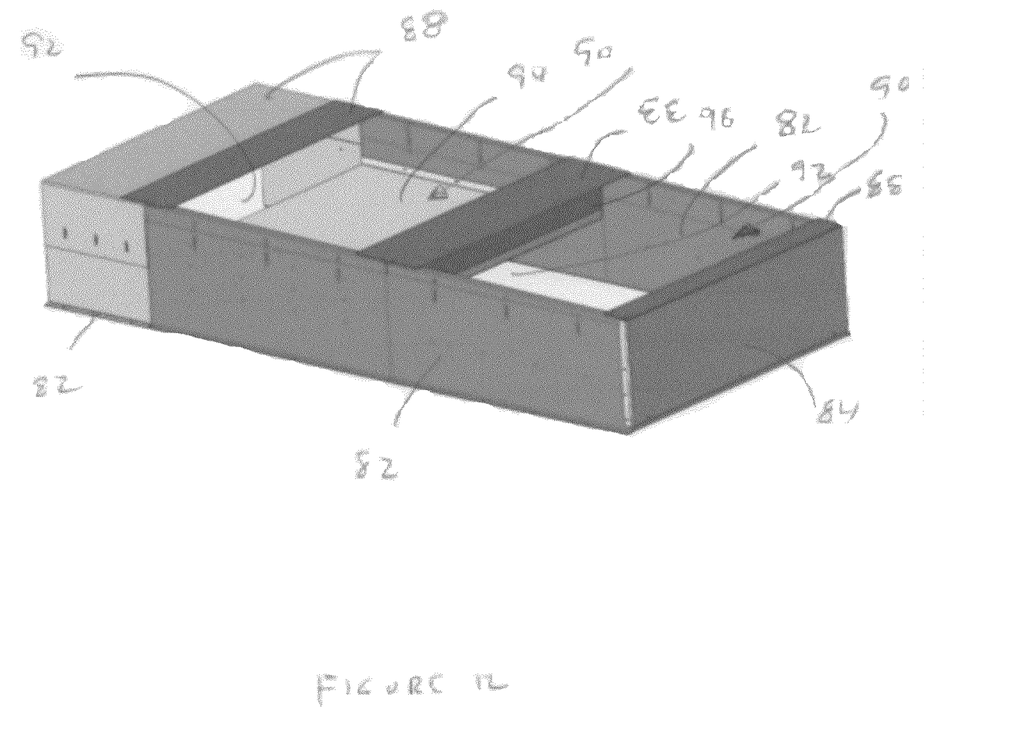
FIG. 12 is an isometric view of another duct.
Figure 13:
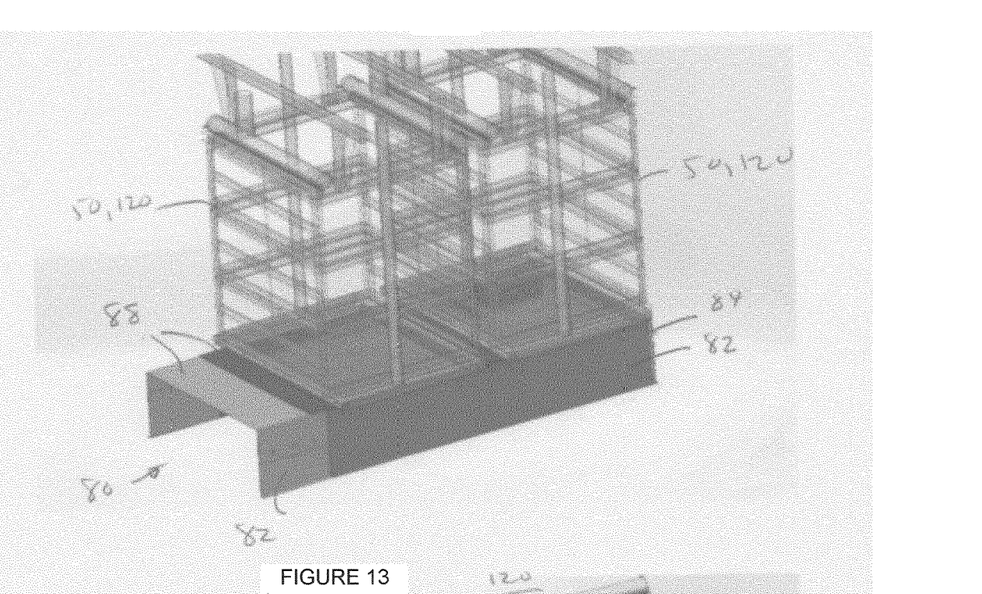
FIG. 13 is an isometric view of parts of two cassettes as in FIG. 11 on top of the duct of FIG. 12.

FIGS. 12 and 13 show two views of another duct 80. In this example, the duct 80 directs influent to two membrane units 120, each having one cassette 50. A baffle 90 is made of horizontal sheet connected to a vertical sheet located under a plate 88. The opening 92 of an upstream baffle is defined, in area, by the width of the duct 80 multiplied by the displacement of the horizontal sheet 94 below the top of the duct 80. The opening 92 of a downstream baffle is defined in area by the width of the duct 80 multiplied by the displacement of the horizontal sheet 94 above the floor of the membrane tank 70.

Figure 14:
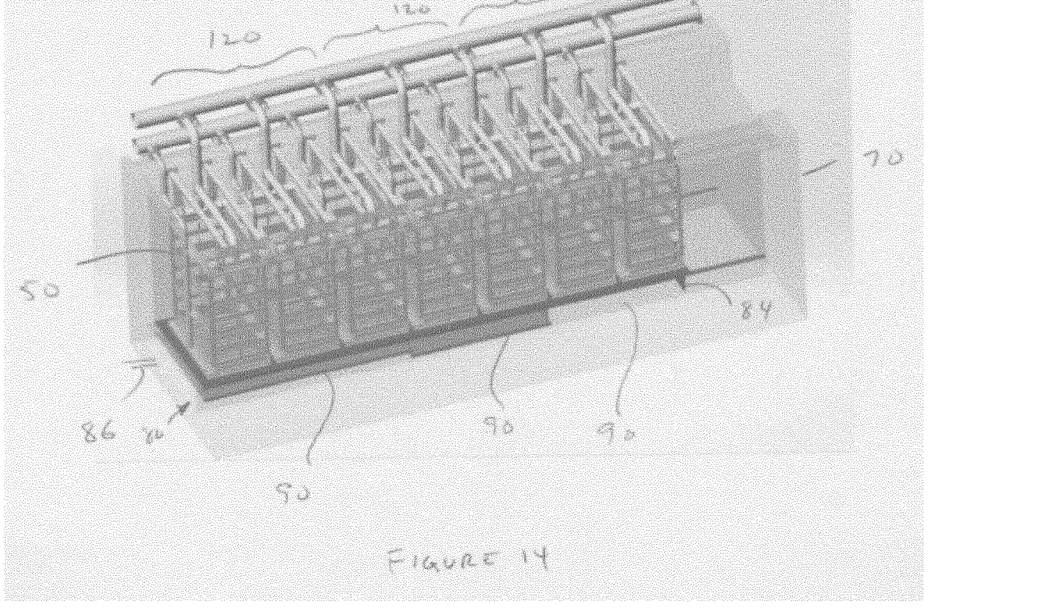
FIG. 14 is an isometric partially cut-away view of parts of seven cassettes as in FIG. 11 on top of another duct installed in a tank.

FIG. 14 shows another duct 80 extending below three membrane units 120. The first membrane unit 98 has three cassettes 50. The second and third membrane units 120 have two cassettes 50 each.

Another example of a duct intended for use with 5 membrane units of equal size in a row extending downstream away from an inlet was modeled as used in an MBR using computational fluid dynamics. The duct 80 was constructed generally as shown in FIGS. 12 and 13 but with more baffles 90 and openings 92. The area of each intermediate opening 92 was defined in area by the width of the duct 80 multiplied by the displacement of the horizontal sheet 94 of the current baffle below the horizontal sheet 94 of an upstream baffle 90.

Table 1 shows the average velocity of mixed liquor through the opening in the modeling example described above with equal opening sizes. As indicated in Table 1, with equal opening sizes, the mixed liquor velocity through different openings was similar but not identical to each other.

TABLE 1

| Opening size (m2) | Average velocity through opening (m/s) |
|---|---|
| 0.38 | 0.3 |
| 0.38 | 0.28 |
| 0.38 | 0.25 |
| 0.38 | 0.2 |
| 0.38 | 0.22 |

Table 2 shows the average velocity of mixed liquor through the openings in the modeling example described above with adjusted (non-equal) opening sizes. As indicated in Table 2, it is possible to substantially equalize the velocity of flow through the openings by adjusting the baffles and/or openings. Further adjustment can substantially equalize the average liquid velocity through the membrane units. Optionally, the velocity of liquid flowing through each of the membrane units can be made to be within 10% of an average velocity through all of the membrane units at a selected influent flow rate, for example an average or peak design flow rate. Generally equal velocities are desirable because a membrane unit with materially lower than average velocity will be exposed to more concentrated mixed liquor at the top of the membrane unit and/or will be cleaned less effectively by the moving liquid.

TABLE 2

| Adjusted opening size ($m^2$) | Average velocity through opening (m/s) |
|---|---|
| 0.34 | 0.25 |
| 0.38 | 0.25 |
| 0.42 | 0.26 |
| 0.38 | 0.26 |
| 0.37 | 0.27 |

An experimental MBR had a separate membrane tank with two cassettes as in FIG. 11. The tank was significantly larger than the cassettes. Return activated sludge (RAS) recycle rate was 4 Q. The membrane tank was initially operated without a duct. The membrane tank was later operated with a duct 80 as shown in FIGS. 12 and 13. Without increasing the trans-membrane pressure (TMP), which was 2 psi while operating with and without a duct, the permeate production more than doubled when the duct was added.

We claim:

1. A method of operating an immersed membrane system comprising the steps of,
providing a membrane tank having a plurality of immersed membrane units;
feeding influent to the membrane tank;
dividing the influent into multiple portions by flowing the influent into one or more ducts, wherein each of the one or more ducts comprises at least one baffle that extends about horizontally: (i) below at least part of the membrane unit above the baffle; and (ii) above the bottom of the duct; and directing each portion of the multiple portions of influent to the bottom of a different membrane unit of the of the plurality of immersed membrane units.

2. The method of claim 1 wherein the immersed membrane system is part of a membrane bioreactor operated with a return activated sludge flow rate at least 1 Q or at least 2 Q.

3. The method of claim 1 further comprising directing the portions of influent upwards through the plurality of membrane units.

4. The method of claim 1 wherein the membrane tank is elongated and/or the membrane units are spaced along the length of the membrane tank.

5. The method of claim 1 wherein at least 90% of the influent fed to the membrane tank flows directly to the bottoms of the immersed membrane units.

6. The method of claim 1 wherein the flow rate of each of the multiple portions is within 10% of an average flow rate of the multiple portions.

7. The method of claim 1 wherein each of the multiple portions leaves the duct through a separate opening.

8. The method of claim 1 wherein the influent flows through the membrane units substantially in a single pass.

9. The method of claim 1 wherein the upwards velocity in the membrane units is 0.025 m/s or more.

10. A membrane filtration system comprising,
a membrane tank;
a plurality of immersed membrane units spaced apart within the membrane tank; and,
one or more ducts extending from an inlet to the membrane tank to a plurality of openings corresponding to the plurality of immersed membrane units, wherein each opening corresponds to a different immersed membrane unit, wherein each of the one or more ducts comprises at least one baffle that extends about horizontally: (i) below at least part of the immersed membrane unit above the at least one baffle; and (ii) above the bottom of the duct.

11. The system of claim 10 wherein each of the plurality of immersed membrane units has one or more cassettes of flat sheet or flat plate ceramic membrane elements within a membrane case creating a vertically oriented flow path through the one or more cassettes.

12. The system of claim 10 wherein the membrane units are, collectively, at least twice as long as they are wide.

13. The system of claim 10 wherein the at least one baffle is displaced vertically below the top of the duct.

14. The system of claim 10 wherein the openings have non-equal sizes.

15. The system of claim 10 wherein the size of the openings is less than 50% of the footprint of the membrane units.

16. The method of claim 7 comprising flowing the influent into the one or more ducts through a duct opening facing into the influent flow.

17. The method of claim 16 wherein the duct opening facing into the influent flow has an area that is about 50% or less than the area of the corresponding separate opening of the duct.

18. The system of claim 10 wherein each baffle forms an influent opening facing the inlet.

19. The system of claim 18 wherein the influent opening has an area that is about 50% or less than the area of the corresponding opening.

20. The method of claim 1 wherein adjacent baffles extend about horizontally at different distances from the bottom of the duct.

21. The system of claim 10 wherein adjacent baffles extend about horizontally at different distances from the bottom of the duct.

22. The method of claim 1 wherein dividing the influent is performed within the membrane tank.

23. The system of claim 10 wherein the one or more ducts are within the membrane tank.

24. The system of claim 10 wherein at least one of the one or more ducts is formed in part by the bottom of the membrane tank.

25. The system of claim 10, wherein the one or more ducts are located below the plurality of immersed membrane units.

* * * * *